United States Patent [19]

Benson

[11] Patent Number: 4,938,339

[45] Date of Patent: Jul. 3, 1990

[54] MEANS FOR LATERALLY SPACING PRODUCTS

[75] Inventor: Dan T. Benson, Joplin, Mo.

[73] Assignee: Ingersoll-Rand Company, Woodcliff Lake, N.J.

[21] Appl. No.: 281,767

[22] Filed: Dec. 9, 1988

[51] Int. Cl.⁵ ............................................. B65G 47/26
[52] U.S. Cl. ................................. 198/458; 198/735.3
[58] Field of Search .................... 198/458; 225/98, 99; 29/239

[56] References Cited

U.S. PATENT DOCUMENTS

| | | | |
|---|---|---|---|
| 3,401,758 | 9/1968 | Ferrari | 198/458 |
| 3,401,785 | 9/1968 | Ferrari | 198/458 |
| 3,533,519 | 10/1970 | Anderson | 198/457 |
| 3,767,027 | 10/1973 | Pund et al. | 198/458 X |
| 3,990,572 | 11/1976 | Fishback | 198/728 X |
| 4,625,856 | 12/1986 | Haas, Sr. et al. | 198/458 |

FOREIGN PATENT DOCUMENTS 532043 8/1955 Italy ................................. 198/458

Primary Examiner—Robert J. Spar
Assistant Examiner—D. Glenn Dayoan
Attorney, Agent, or Firm—James R. Bell; Bernard J. Murphy

[57] ABSTRACT

A platform includes linear trackways which diverge and then lie in parallel along a given axis, and spaced apart. A plurality of flight bars, equally spaced apart, and lying traverse of the trackways, are movable along the axis and upon the platform. The bars engage rearmost, axial ends of juxtaposed, elongate products and push the products toward the trackways. Shoes supported above the platform, and lying above the trackways where they diverge, engage the products, as they are pushed along the platform, and force the products into and along the divergent trackways.

10 Claims, 2 Drawing Sheets

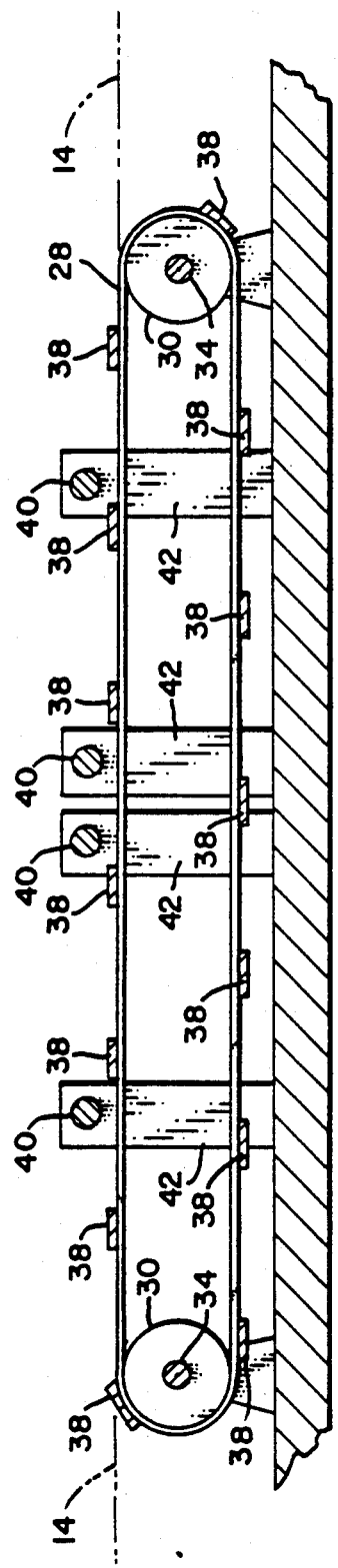
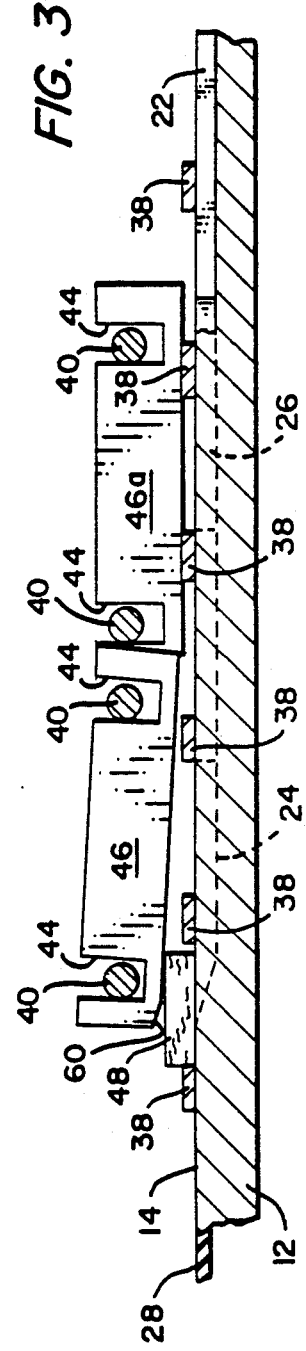

MEANS FOR LATERALLY SPACING PRODUCTS

BACKGROUND OF THE INVENTION

This invention pertains to product processing and/or treatment apparatus, and in particular to means for laterally spacing juxtaposed, elongate products.

While not limited thereto, the invention has an especial application in the processing of frozen fish sticks, in which application the sticks are forced apart, laterally, to accommodate for breading thereof and/or other treatment.

Fish sticks, according to a known method of their production are formed from frozen fillets which have been cut into parallel pieces, i.e., sticks. The more efficient and sanitary method of cutting the fillets is by means of jets of pure water from waterjet cutting equipment such as is manufactured and marketed by Ingersoll-Rand Company via its facility in Baxter Springs, Kans.

Sticks resulting from the jet cutting, for still being frozen, adhere to each other. Especially is this so because the cutting jets are so fine that the lines of severance are difficult to discern, and the sticks adhere due to the frost and/or surface tension. Alignment of the lines of severance with a plow-type spreader is not practical; the cuts, typically, are but six thousandths of an inch in width. Accordingly, there obtains a need for a new means for laterally spacing such juxtaposed elongate products, be they fish sticks or otherwise.

SUMMARY OF THE INVENTION

It is an object of this invention, then, to set forth a means for laterally spacing juxtaposed, elongate products, comprising a platform; said platform having (a) a given planar surface, and (b) a pair of trackways; wherein said trackways have walls which lie substantially normal to said surface; and said trackways are laterally spaced apart from each other; and further including means for moving juxtaposed, elongate products, in a given axial direction, along said surface toward said trackways; and means supported above, and in proximity to, said surface, for urging one of such juxtaposed products, during movement thereof along said surface, to (a) veer from said axial direction, and (b) travel through one of said trackways.

Further objects of this invention, as well as the novel features thereof, will become more apparent by reference to the following description taken in conjunction with the accompanying figures, in which:

BRIEF DESCRIPTION OF THE DRAWING FIGURES

FIG. 2 is a cross-sectional view taken along section 2—2 of FIG. 1; and

FIG. 3 is a cross-sectional view taken along section 3—3 of FIG. 1.

DETAILED DESCRIPTION

Figure 1:
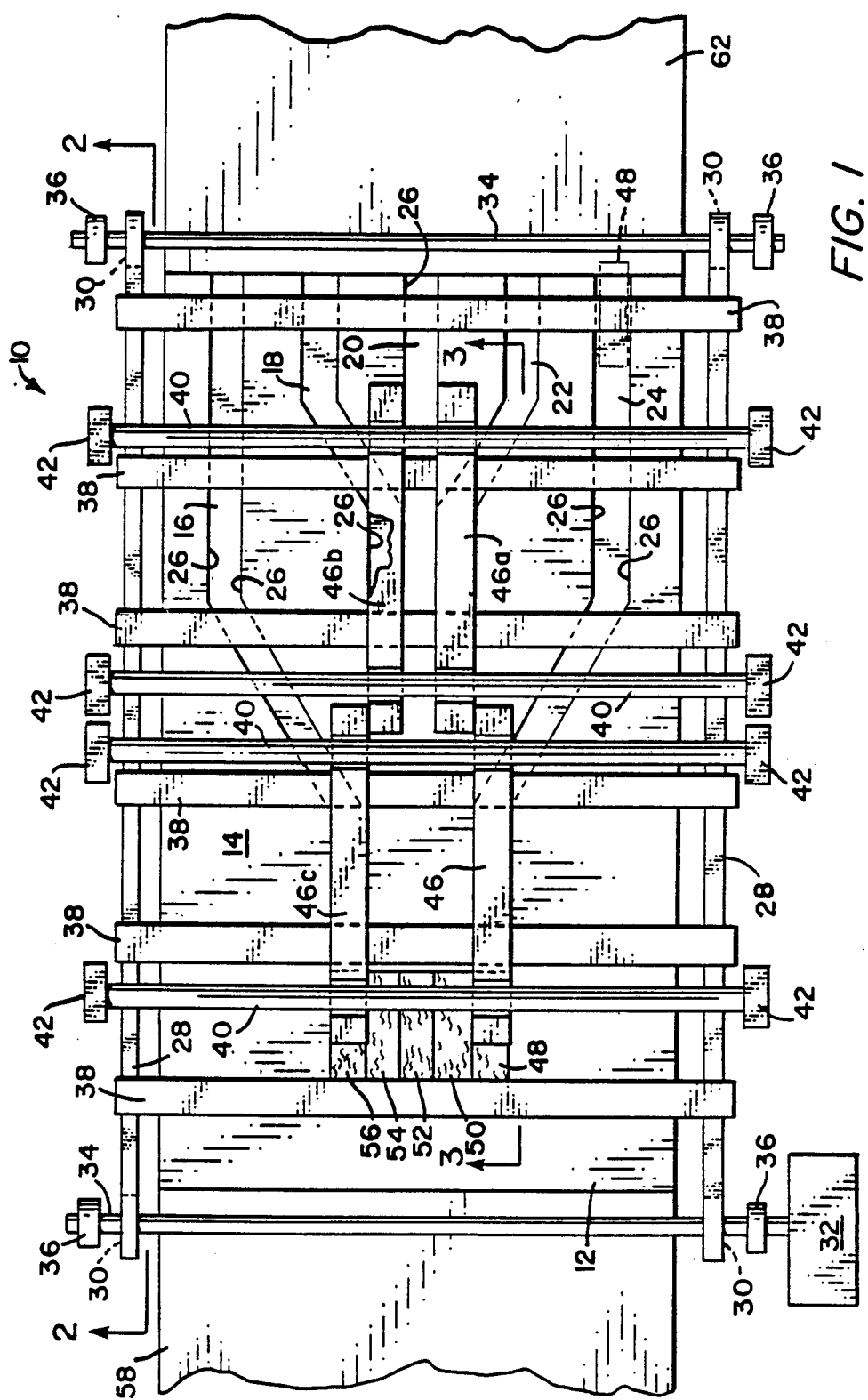
FIG. 1 is a plan view of an embodiment of the invention.

As shown in the figures, an embodiment 10 of the novel products spacing means comprises a platform 12 having a given planar surface 14 in which are formed a plurality of recessed trackways 16, 18, 20, 22 and 24. Trackways 16, 18, 22 and 24 describe dog-legs throughout the lengths thereof, whereas track 20 is straight and of shorter length. For being recessed, the trackways have parallel walls 26 within which to guide products.

Continuous belts 28, at each side of the platform 12, are fixed about sheaves 30 which are driven by a motor 32. The sheaves 30 are carried on shafts 34 which are journalled in pillow blocks 36. Fixed to the belts (by means not shown) are flight bars 38. The bars 38 are equally spaced apart, along the belts 28, and traverse the trackways 16, 18, 20, 22 and 24. The bars 38 as shown in FIGS. 2 and 3, travel with the belts 28 upon the surface 14 of the platform 12. Bridging across the platform 12, and above the belts 28, are four reaction bars 40. The latter are supported by stanchions 42 on opposite sides of the platform 12. The bars 40 are received in channels 44 formed, fore and aft, in shoes 46, 46a, 46b and 46c; the shoes ride upon the flight bars 38, which travel therebelow, and are captured by the reaction bars 40. The channels 44 are of sufficient depth so that the shoes may elevate a short distance on the reaction bars 40.

In operation, a fish fillet, by way of example, which has been cut into sticks 48, 50, 52, 54 and 56 will be transported to the platform 12 from an upstream, adjoining apron 58, where they can be engaged by an upstream flight bar 38. Such flight bar closes upon the trailing axial ends of the sticks and pushes them along the platform surface 14. As the sticks come upon trackways 16 and 24 the leading ends of sticks 48 and 56 contact the abutment surfaces 60 of shoes 46 and 46c. Sticks 48 and 56 are "nosed" down and under these shoes 46 and 46c, being separated thereby from sticks 50, 52, and 54, and are constrained to enter trackways 24 and 16, respectively. Subsequently the latter trackways diverge outwardly from each other and then re-align in parallelism. With the continuous travel of the belts 28 and the pushing of the flight bars 38, sticks 48 and 56 are urged fully along trackways 24 and 16. It is to be noted that, where trackway 24 and 16 first diverge, shoes 46 and 46c (the latter shown only in phantom) are positioned thereabove. These shoes 46 and 46c constrain the leading ends of the sticks 48 and 56 to follow the diverging trackways 24 and 16. (In phantom, in FIG. 1, stick 48 is shown emerging from trackway 24 onto an upstream apron 62.)

Similarly, sticks 50, 52 and 54; travel along surface 14, being pushed by a flight bar 38, until sticks 50 and 54 come upon trackways 22 and 18. Shoes 46a and 46b (shoe 46b is shown separated, in FIG. 1, only for expository purposes) force sticks 50 and 54 to separate from stick 52, and to descend into the trackways 22 and 18, respectively. Here too, the shoes 46a and 46b are positioned above the areas of divergence of trackways 22 and 18, and constrain the sticks 50 and 54 to follow the divergences.

Stick 52 has remained centrally positioned and is simply pushed to the upstream end of the platform where it moves into trackway 20 and is pushed onto apron 62, therefrom, by a flight bar 38.

Each shoe 46, 46a, 46b, and 46c has a channel 44 of only such depth that, cooperative with the reaction bars 40, they can not elevate enough to allow a stick to escape from its trackway. Shoes 46 and 46c and also guide sticks 50, 52 and 54 in axial travel, as do shoes 46a and 46b guide stick 52 (to its trackway 20).

While I have described my invention in connection with a specific embodiment thereof it is to be clearly understood that this is done only by way of example, and not as a limitation to the scope of my invention as set forth in the objects thereof and in the appended claims.

I claim:

1. Apparatus for laterally spacing juxtaposed, elongate products, comprising:
   a platform;
   said platform having a given planar surface, and a plurality of trackways having divergent portions; wherein
   said trackways are recessed into said surface;
   means for moving said juxtaposed, elongate products, in a given axial direction, along said surface toward said trackways; and
   means supported above, and in proximity to, said surface, for urging said products, during movement thereof along said surface into said recessed trackways for lateral spacing thereof in response to movement of said products through said divergent portions, said means for urging being supported by said means for moving said products.

2. The apparatus according to claim 1, wherein said moving means comprises a plurality of pushers, spaced apart, for engaging ends of said juxtaposed products and pushing said products in said axial direction.

3. The apparatus according to claim 1, wherein:
   said moving means comprises a bar exending across said platform in traverse of said trackways.

4. The apparatus according to claim 3, wherein:
   said bar is movable, in said axial direction, for (a) engaging ends of said juxtaposed products, and (b) pushing said products in said axial direction on said platform.

5. The apparatus according to claim 1, wherein said urging means comprises a deflector disposed for contacting engagement with said products, and having means for constraining said products to enter said trackways.

6. The apparatus according to claim 1, wherein:
   said moving means comprises (a) a plurality of bars, spaced apart, and extending across said platform in traverse of said trackways, and (b) means for moving said bars in said axial direction; and
   said bars comprise means for (a) engaging ends of said juxtaposed products, and (b) pushing said products in said direction on said platform.

7. The apparatus according to claim 5, wherein:
   said deflector is mounted for elevating movement, relative to said platform; and
   said moving means comprises means for elevating said deflector relative to said platform.

8. The apparatus according to claim 5, wherein said deflector comprises an elongated shoe aligned along said axial direction; said moving means comprises (a) a plurality of bars, spaced apart, and extending across said platform in traverse of said trackways, and (b) means for moving said bars in said axial direction; said shoe has an abutment surface at an end thereof; and said bars comprise means for (a) engaging first ends of said juxtaposed products, and (b) pushing said products in said axial direction, on said platform, to cause a second end of said products to engage said abutment surface of said shoe and be forced under said shoe to enter a respective trackway.

9. The apparatus according to claim 8, further including:
   means for engaging said shoe for (a) restricting elevation of said shoe, and (b) causing said shoe to bear against said products.

10. Apparatus for laterally spacing a plurality of axially moving juxtaposed objects, comprising:
    a platform having a planar surface and a plurality of divergent trackways recessed in said surface;
    means for moving the objects in a given axial direction along said surface toward said trackways; and
    deflector means for urging said objects into said trackways, said deflector means mounted for vertical deflection relative to said objects and restrained from movement in the axial direction, said deflector means being supported above said surface by said means for moving.

* * * * *